(12) United States Patent
Renz (10) Patent No.: US 12,327,886 B2
(45) Date of Patent: Jun. 10, 2025

(54) FLUID DRAINAGE ARRANGEMENT FOR A BATTERY (71) Applicant: Dr. Ing. h.c. F. Porsche Aktiengesellschaft, Stuttgart (DE)

(72) Inventor: Fadi Renz, Kornwestheim (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 563 days.

(21) Appl. No.: 17/852,559

(22) Filed: Jun. 29, 2022

(65) Prior Publication Data

US 2023/0006322 A1 Jan. 5, 2023

(30) Foreign Application Priority Data

Jun. 30, 2021 (DE) .......................... 102021116769.8

(51) Int. Cl.
*H01M 50/691* (2021.01)
*H01M 10/613* (2014.01)
*H01M 10/625* (2014.01)
*H01M 10/6556* (2014.01)
*H01M 10/6567* (2014.01)
*H01M 10/6568* (2014.01)
*B60L 50/64* (2019.01)
*B60L 58/26* (2019.01)

(52) U.S. Cl.
CPC ....... *H01M 50/691* (2021.01); *H01M 10/613* (2015.04); *H01M 10/625* (2015.04); *H01M 10/6556* (2015.04); *H01M 10/6567* (2015.04); *H01M 10/6568* (2015.04); *B60L 50/64* (2019.02); *B60L 58/26* (2019.02); *H01M 2220/20* (2013.01)

(58) Field of Classification Search
CPC ............ H01M 50/691; H01M 10/613; H01M 10/625; H01M 10/6556; H01M 10/6567; H01M 10/6568; H01M 2220/20
See application file for complete search history.

(56) References Cited

U.S. PATENT DOCUMENTS 8,865,333 B2 10/2014 Phlegm et al.
2018/0238764 A1 8/2018 Kim et al.

FOREIGN PATENT DOCUMENTS

| DE | 102008034879 A1 | 1/2010 |
| DE | 102011015926 A1 | 10/2012 |
| DE | 102013212859 A1 | 1/2014 |
| DE | 102013014903 A1 | 3/2015 |

(Continued)

*Primary Examiner* — Jane J Rhee
(74) *Attorney, Agent, or Firm* — Buchanan Ingersoll & Rooney PC (57) ABSTRACT A fluid drainage arrangement for a battery arrangement, the fluid drainage arrangement having a fluid inlet, a collecting chamber, a membrane, a labyrinth chamber and a fluid outlet. The membrane is provided between the collecting chamber and the labyrinth chamber and has a closed state (Z1) and an open state (Z2). The membrane is designed, in the closed state (Z1), to collect a coolant, which passes into the collecting chamber via the fluid inlet, in the collecting chamber until the membrane, at a predetermined first differential pressure between a side of the membrane that is assigned to the collecting chamber and a side of the membrane that is assigned to the labyrinth chamber, transitions from the closed state (Z1) into the open state (Z2) and allows drainage of the coolant via the labyrinth chamber to the fluid outlet.

16 Claims, 5 Drawing Sheets

(56) References Cited

FOREIGN PATENT DOCUMENTS

| | | | |
|---|---|---|---|
| EP | 2533346 | A1 | 12/2012 |
| EP | 2760075 | A1 | 7/2014 |
| JP | 2012146531 | A | 8/2012 |
| KR | 20200041007 | A | 4/2020 |
| WO | 2010012339 | A1 | 2/2010 |

FLUID DRAINAGE ARRANGEMENT FOR A BATTERY

CROSS-REFERENCE TO RELATED APPLICATION

This application claims priority to German Patent Application No. 102021116769.8, filed Jun. 30, 2021, the content of such application being incorporated by reference herein in its entirety.

FIELD OF THE INVENTION

The invention relates to a fluid drainage arrangement, to a battery arrangement and to a vehicle.

BACKGROUND OF THE INVENTION

DE 10 2013 014 903 A1, which is incorporated by reference herein, shows a battery having liquid-cooled individual cells, in which battery the wall of the battery housing has a predetermined breaking point which allows coolant to escape from the battery housing.

DE 10 2013 212 859 B4, which is incorporated by reference herein, shows a battery system in which a driver is informed in the event of formation of condensed water, and valves are activated when an aqueous solution with coolant is detected.

KR 10 2020 0 041 007, which is incorporated by reference herein, shows a battery pack having a cooling flow path connector, a connecting flow path and a cooling water discharge unit.

US 2018/0 238 764 A1, which is incorporated by reference herein, shows a battery pack having a moisture collecting unit and a moisture outlet unit.

SUMMARY OF THE INVENTION

A fluid drainage arrangement for a battery arrangement has a fluid inlet, a collecting chamber, a membrane, a labyrinth chamber and a fluid outlet, which membrane is provided between the collecting chamber and the labyrinth chamber and has a closed state and an open state, and which membrane is designed, in the closed state, to collect a coolant, which passes into the collecting chamber via the fluid inlet, in the collecting chamber until the membrane, at a predetermined first differential pressure between a side of the membrane that is assigned to the collecting chamber and a side of the membrane that is assigned to the labyrinth chamber, transitions from the closed state into the open state and allows drainage of the coolant via the labyrinth chamber to the fluid outlet. If a battery arrangement is damaged for example as a result of damage in the event of an accident, the coolant can pass to the outside via the fluid drainage arrangement, and this makes it possible to avoid a short circuit in the battery arrangement. The labyrinth chamber here makes it possible to prevent or at least make it more difficult for liquid, dirt or relatively small mammals to enter the battery arrangement from the surroundings in an unimpeded manner. In the closed state, the membrane preferably prevents air moisture from entering the battery arrangement.

According to a preferred embodiment, the membrane is designed, after the transition from the closed state into the open state, no longer to transition into the closed state. This is possible for example by virtue of the fact that the membrane transitions into the open state as a result of destruction, or no resetting element or no restoring force is provided.

According to a preferred embodiment, the membrane is designed, after the transition from the closed state into the open state, to transition again into the closed state. This is possible for example by means of a resetting spring, by means of an elastic material or by means of an additional resetting element. Here, the transition back into the closed state preferably occurs at a lower differential pressure than the first differential pressure or by means of a manual actuation by a user.

According to a preferred embodiment, the fluid drainage arrangement has a bottom element for a battery arrangement, which bottom element is trough-shaped and has a drainage slope for a coolant, and which drainage slope is fluidically connected to the collecting chamber in order to allow drainage of a coolant from the battery arrangement to the collecting chamber. The drainage slope allows controlled drainage of the coolant in the fluid drainage device.

According to a preferred embodiment, the drainage slope is fluidically connected to the collecting chamber via a hose. Hoses have the advantage that they can be easily mounted and can, where appropriate, also be designed to be elastic in order to reduce temporarily occurring high pressures.

According to a preferred embodiment, the hose is fastened via at least one clamp. Clamps allow stable connections, even under extreme conditions with strong vibrations.

According to a preferred embodiment, the membrane is designed to perform a transition from the closed state into the open state if a predetermined amount of coolant has collected on the first side of the membrane. This allows a noncritical amount of coolant to accumulate before the membrane transitions into the open state. By contrast, in the case of an amount which at least corresponds to the predetermined amount of coolant, the membrane is set into the open state, and the coolant can flow off.

According to a preferred embodiment, the fluid drainage arrangement has a labyrinth chamber part and a cover part, which labyrinth chamber part forms the labyrinth chamber, which cover part forms the collecting chamber in a cover part extension, and which cover part is connected to the labyrinth chamber part. This facilitates the production of the labyrinth chamber and the collecting chamber.

According to a preferred embodiment, a sealing element is provided between the labyrinth chamber part and the cover part. This prevents the escape of coolant at the connecting point.

According to a preferred embodiment, the fluid drainage arrangement contains, at least in certain regions, at least one material from the group of materials consisting of:
plastic,
aluminum, and
aluminum allloy.

These materials are lightweight and can guide the coolant well.

According to a preferred embodiment, the labyrinth chamber has a lateral wall, a labyrinth interior and shaped elements, which shaped elements extend from the lateral wall into the labyrinth interior in order to prevent or at least to reduce a rectilinear flow of a fluid through the labyrinth chamber. This allows the coolant to exit, on the one hand, but, on the other hand, makes it more difficult for a fluid to directly enter the battery arrangement from outside.

According to a preferred embodiment, the shaped elements approach the fluid outlet at least partially at least in certain portions in their extent from the lateral wall into the labyrinth interior. In a preferred arrangement of the fluid outlet below the fluid inlet, it is possible for example for a coolant to flow easily to the fluid outlet, but, on the other hand, a liquid medium is prevented from flowing in the reverse direction. Furthermore, it is more difficult for animals to crawl into the labyrinth chamber.

According to a preferred embodiment, the shaped elements are at least partially designed to be flat at least in certain portions. The flat design is well-suited to preventing a strong direct fluid flow through the labyrinth chamber.

A battery arrangement has such a fluid drainage arrangement. This reduces the risk that, in the event of a failure or destruction of the cooling system of the battery arrangement, there occurs a short circuit as a result of the coolant and thus greater damage such as a fire in the vehicle. The buildup of a coolant column in the battery arrangement can be prevented.

A vehicle has such a battery arrangement. Safety is important in vehicles, and the fluid drainage arrangement increases the safety.

According to a preferred embodiment, the fluid outlet is fluidically connected to the surroundings of the vehicle in order to allow drainage of a coolant into the surroundings of the vehicle. This leads to good separation of the coolant from the battery arrangement and reduces the risk of a short circuit. Water-glycol mixtures are frequently used as coolants or for a good heat transfer, and drainage of such a mixture in the event of damage is possible.

According to a preferred embodiment, the collecting chamber is arranged above the labyrinth chamber at least in certain regions. This facilitates the drainage of the coolant in the event of damage.

BRIEF DESCRIPTION OF THE DRAWINGS

Further details and advantageous developments of the invention will emerge from the exemplary embodiments described below and illustrated in the drawings, which embodiments should in no way be understood as restricting the invention, and also from the dependent claims. It is understood that the features mentioned above and the features yet to be discussed below may be used not only in the respectively specified combination but also in other combinations or individually without departing from the scope of the present invention. In the FIGs.:

Identical or functionally identical parts are provided with the same reference signs below and are usually described only once. The description spans the figures such that these build on one another, in order to avoid unnecessary repetitions.

DETAILED DESCRIPTION OF THE INVENTION

Figure 1:
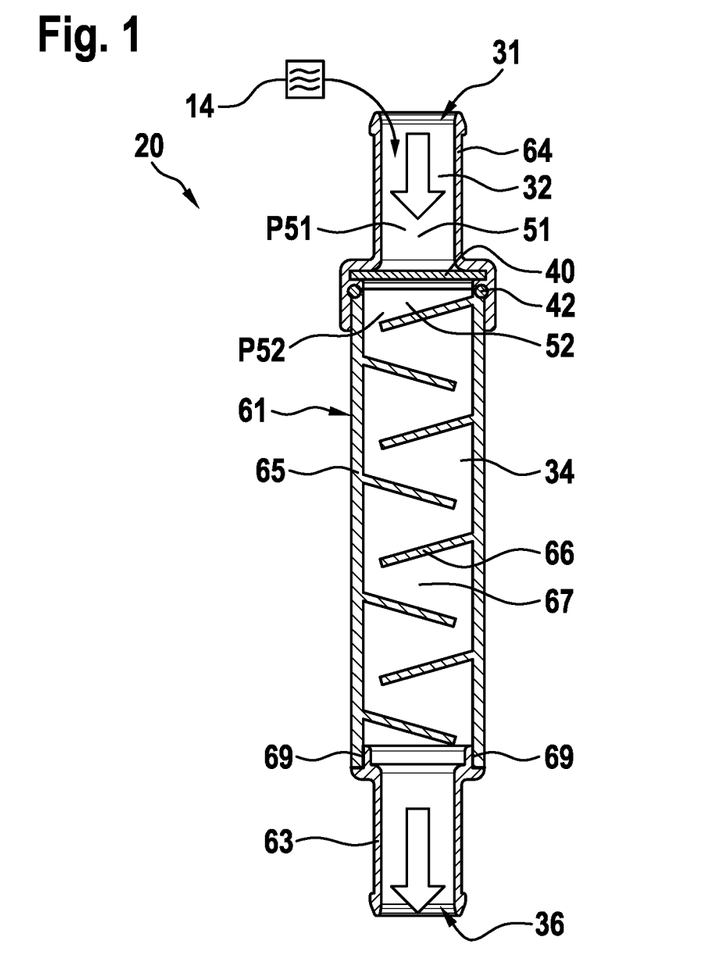
FIG. 1 shows one exemplary embodiment of a fluid drainage arrangement in a longitudinal section.
Figure 5:
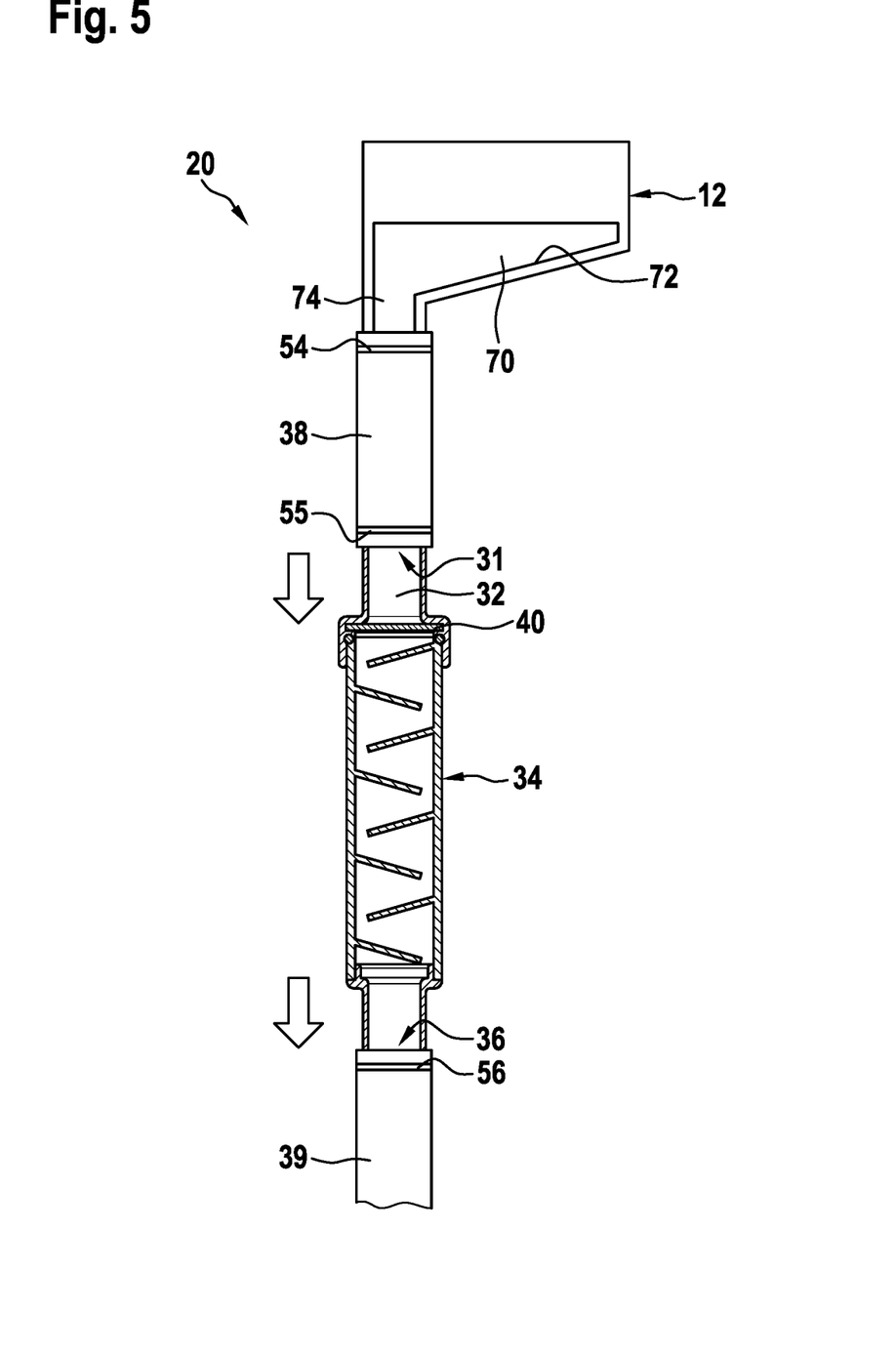
FIG. 5 shows a battery arrangement with the fluid drainage arrangement of FIG. 1 in a partial longitudinal section.

FIG. 1 shows a fluid drainage arrangement 20 for a battery arrangement 12, as is represented for example in FIG. 5. The fluid drainage arrangement 20 has a fluid inlet 31, a collecting chamber 32, a membrane 40, a labyrinth chamber 34 and a fluid outlet 36.

The membrane 40 is provided between the collecting chamber 32 and the labyrinth chamber 34. In a closed state Z1, the membrane 40 is designed to collect a coolant 14, which passes into the collecting chamber 32 via the fluid inlet 31, in the collecting chamber 32.

As soon as a predetermined first differential pressure P51-P52 is present between a side 51 of the membrane 40, with the pressure P51, that is assigned to the collecting chamber 32 and a side 52 of the membrane 40, with the pressure P52, that is assigned to the labyrinth chamber 34, the membrane 40 changes from a closed state Z1 into an open state Z2, and the coolant can flow out of the collecting chamber 32 to the fluid outlet 36 via the labyrinth chamber 34. The predetermined first differential pressure can be 0.1 bar, 0.3 bar or 0.5 bar, for example. It preferably lies in the range from 0.1 bar to 1.0 bar, more preferably in the range from 0.2 bar to 0.9 bar.

The fluid drainage arrangement 20 has a labyrinth chamber part 61 and a cover part 62.

The cover part 62 forms the collecting chamber 32 in a cover part extension 64, and the cover part 62 is connected to the labyrinth chamber part 61, for example by means of an adhesive connection or by means of a screw connection.

This design also allows simple mounting of the membrane 40 between the collecting chamber 32 and the labyrinth chamber 34.

A sealing element 42 is provided between the labyrinth chamber part 61 and the cover part 62. The sealing element 42 can be an O-ring or a lip seal, for example.

A lower cover part 63 is connected to the labyrinth chamber part 61, and the cover part 63 forms the fluid outlet 36. The cover part 63 is, for example, connected to the labyrinth chamber part 61 via an adhesive connection 69, but some other connection can also be chosen, for example a screw connection.

The labyrinth chamber 34 has a lateral wall 65, a labyrinth interior 67 and shaped elements 66. The shaped elements 66 extend from the lateral wall 65 into the labyrinth interior 67. This prevents or at least reduces a rectilinear flow of the coolant 14, or of a fluid in general, through the labyrinth chamber 34.

The shaped elements 66 approach the fluid outlet 36 at least partially at least in certain portions in their extent from the lateral wall 65 into the labyrinth interior 67. Expressed in other words, in the arrangement according to FIG. 1, the shaped elements 66 project at least partially at least in certain portions downward toward the fluid outlet 36, or they are inclined in this direction. This allows the coolant 14 to flow off easily toward the fluid outlet 36; however, a flow of a fluid in the reverse direction is made more difficult.

The shaped elements 66 are preferably at least partially designed to be flat at least in certain portions. They can, for example, project like a springboard into the labyrinth interior 57, but they can also be connected laterally to the lateral wall 65 up to their free end.

A further advantage of the labyrinth chamber 34 lies in the fact that animals are prevented from entering, or at least will find it harder to enter, from the fluid outlet 36 to the fluid inlet 31 and possibly into the battery arrangement on account of the configuration of the labyrinth interior 67. In particular martens and other animals of the taxonomic suborder of canids can be prevented by the labyrinth chamber 34 from entering the high-voltage battery.

The fluid drainage arrangement 20 preferably contains, at least in certain regions, at least one material from the group of materials consisting of:
- plastic,
- aluminium, and
- aluminium alloy.

These are lightweight and nevertheless stable materials which are particularly well-suited.

Figure 2:
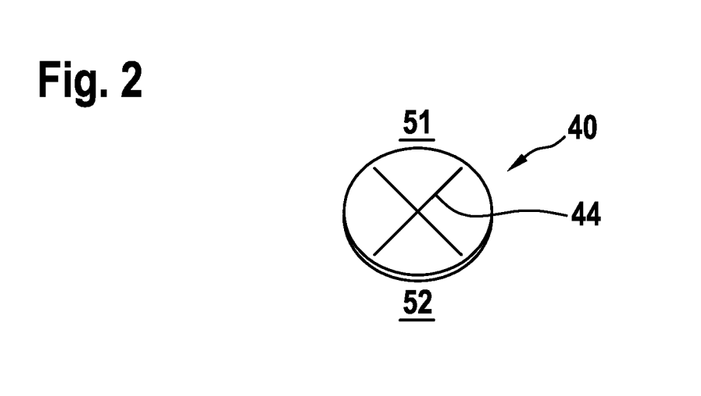
FIG. 2 shows a membrane of the fluid drainage arrangement of FIG. 1 in a three-dimensional representation.

FIG. 2 shows an embodiment of the membrane 40 of FIG. 1. The membrane 40 has two predetermined tearing points 44 which are arranged in a cross shape and which tear open at a predetermined differential pressure between the upper side and lower side of the membrane 40 and allow a fluid flow through the membrane 40. The predetermined tearing points 44 can also be referred to as predetermined breaking points. In such a design, the membrane 40 can be formed, for example, from a plastic or from a thin metal sheet. By virtue of tearing open, the membrane 40 can no longer transition from the open state Z2 into the closed state Z1, with the transition from the closed state Z1 into the open state Z2 thus being irreversible, and the membrane 40 is destroyed. In such a case, the membrane 40 can be replaced in a workshop, for example.

In a further embodiment, the membrane 40 can be formed, for example, from a rubber-elastic material, and the lines 44 arranged in a cross can be formed, for example, as continuous slits. By virtue of the rubber-elastic design of the material, the membrane 40 can open in the region of the lines 44 at a differential pressure, and coolant 14 can flow through. As soon as the differential pressure is no longer present, the membrane 40 can close again. As a result, after the transition from the closed state Z1 into the open state Z2, a transition of the membrane 40 into the closed state Z1 again is possible. There can also be provision that the membrane 40 can be moved into the closed state Z1 by means of a manual actuation by a user.

The membrane 40 is preferably designed to perform a transition from the closed state Z1 into the open state Z2 if a predetermined amount of coolant 14 has collected on the first side 51 of the membrane 40. The rise of the coolant 14 in the collecting chamber 32 causes an increase in the hydrostatic pressure, and the membrane 40 opens from a certain value of the hydrostatic pressure.

The membrane 40 also opens for example in the case of an overpressure arising in the battery arrangement 12 as a result of degassing and can act alone, or assisting a pressure-equalizing element such as a rupture disk, as a safety valve for the battery arrangement 12. Such an overpressure can occur, for example, in the event of damage to the battery arrangement.

In the exemplary embodiment, the membrane 40 has a round basic shape or, for example, the basic shape of an ellipse.

Figure 3:
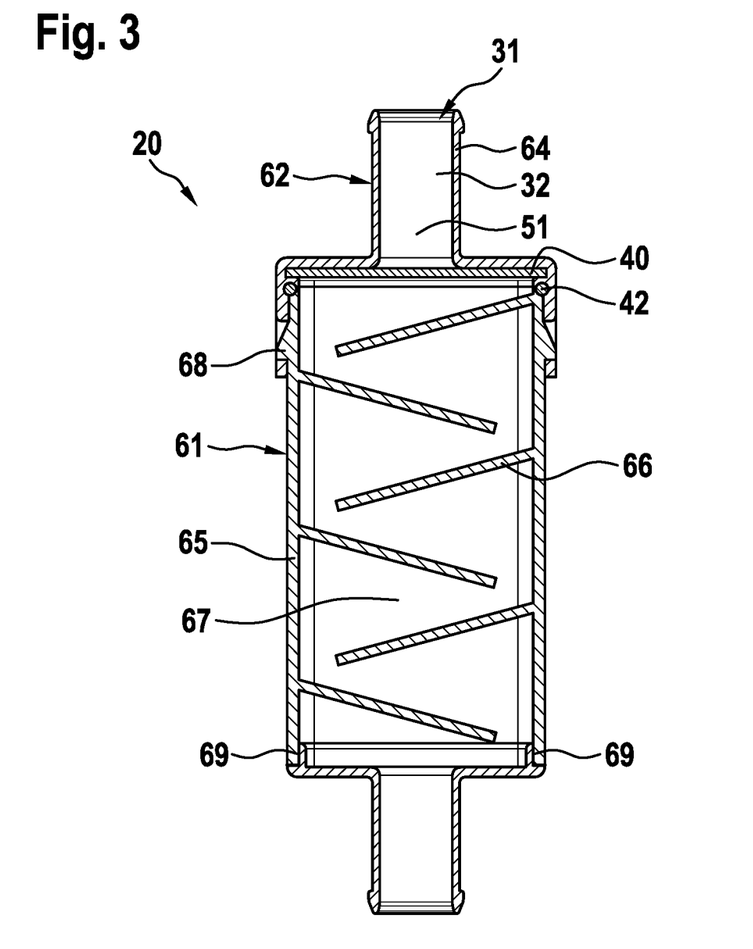
FIG. 3 shows a further exemplary embodiment of a fluid drainage arrangement in a longitudinal section.

FIG. 3 shows a further exemplary embodiment of the fluid drainage arrangement 20. The basic functioning corresponds to the functioning of the fluid drainage arrangement 20 of FIG. 1. By contrast with the embodiment of FIG. 1, the labyrinth chamber 34 is designed to be wider relative to the height of the labyrinth chamber 34. The labyrinth chamber part 61 is connected to the cover part 62 via a latching connection 68, and this facilitates the replacement of the membrane 40.

Unlike in the exemplary embodiment of FIG. 1, the labyrinth chamber 34 has a quadrangular cross section.

Figure 4:
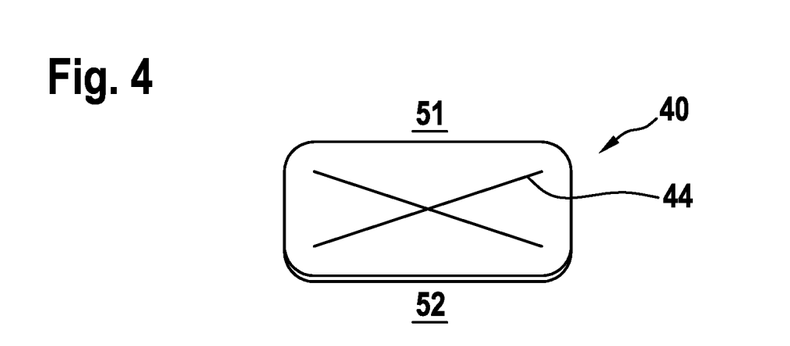
FIG. 4 shows a membrane of the fluid drainage arrangement of FIG. 3 in a three-dimensional representation.

FIG. 4 shows a further embodiment of the membrane 40 for the fluid drainage arrangement 20 of FIG. 3. Matching the cross section of the labyrinth chamber 34 of FIG. 3, the membrane 40 has a quadrangular shape with rounded corners.

FIG. 5 shows a battery arrangement 12 with the fluid drainage arrangement 20 fastened thereto. The battery arrangement 12 is preferably a traction battery or a high-voltage battery arrangement.

The fluid drainage arrangement 20 has a bottom element 70 for the bottom region of the battery arrangement 12. The bottom element 70 is trough-shaped in form, and it has a drainage slope 72 for the coolant 14. The drainage slope 72 is fluidically connected to the collecting chamber 32 via a drain 74 in order to allow drainage of the coolant 14 from the battery arrangement 12 to the collecting chamber 32. The coolant 14 can pass, for example, into the bottom element 70 and thus to the collecting chamber 32 if a leakage occurs in the coolant circuit of the battery arrangement 12. This can be the case for example in the event of damage caused by an accident or with the occurrence of a leakage point.

The drainage slope 72 is fluidically connected to the collecting chamber 32 via a hose 38. The outlet 36 is, for example, fluidically connected to the surroundings of a vehicle via a hose 39; it can end, for example, in the region of the underfloor of the vehicle. The hoses 38, 39 are preferably fastened via clamps 54, 55 and 56.

For assembly purposes, the entire fluid drainage arrangement 20 can be plugged together or mounted in a comparatively simple manner.

Figure 6:
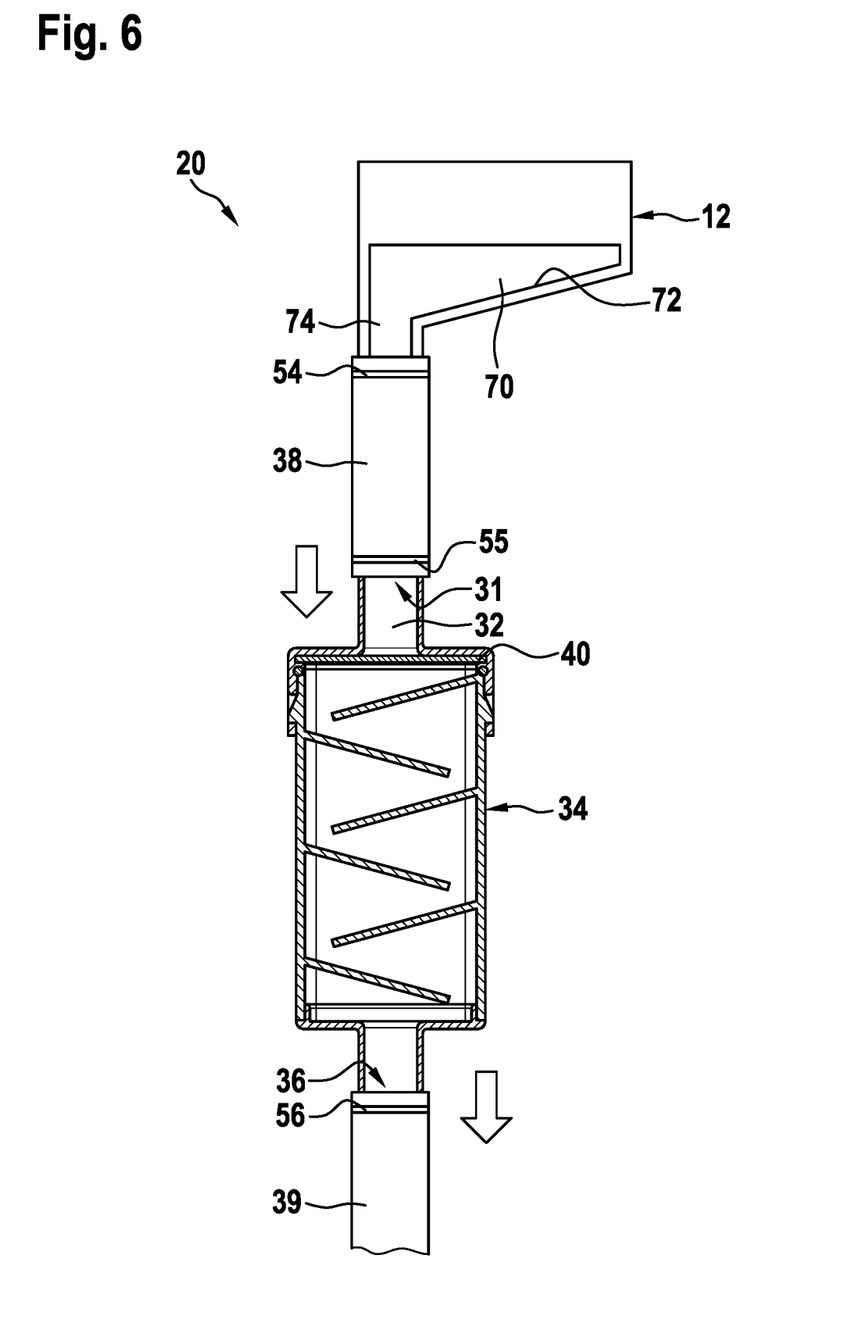
FIG. 6 shows a battery arrangement with the fluid drainage arrangement of FIG. 3 in a partial longitudinal section.

FIG. 6 shows a corresponding embodiment with the battery arrangement 12 and the fluid drainage arrangement 20 of FIG. 3.

Figure 7:
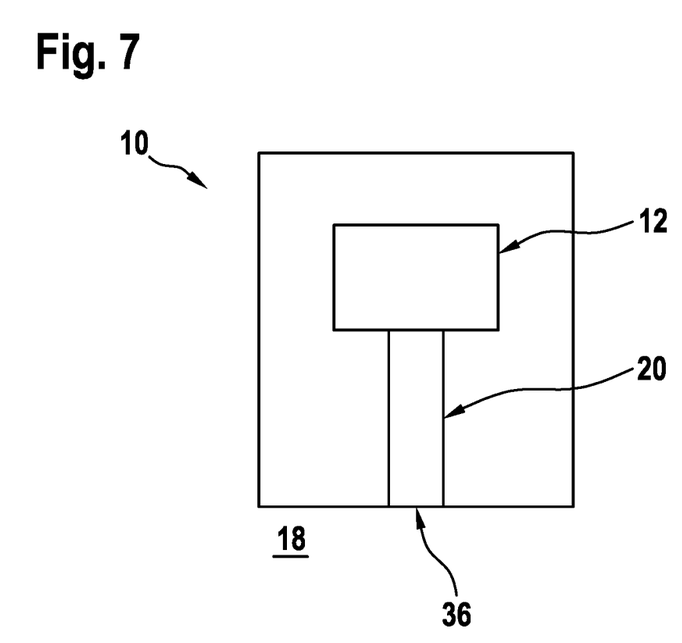
FIG. 7 shows a vehicle with a battery arrangement in a schematic representation.

FIG. 7 shows a vehicle 10 which has the battery arrangement 12 with the fluid drainage arrangement 20. The fluid outlet 36 here is preferably fluidically connected to the surroundings 18 of the vehicle 10 in order to allow outflow or drainage of the coolant 14 into the surroundings of the vehicle 10.

Numerous variations and modifications are of course possible within the scope of the present invention.

The fluid drainage arrangement 20 is preferably arranged in such a way that the fluid outlet 36 is below the collecting chamber 32 in order to allow good drainage or outflow as a result of gravitational force. However, it is also possible to arrange the fluid drainage arrangement 20 in another position and to orient it as stated above only as required.

The fluid inlet 31 and the fluid outlet 36 can be provided further away from the labyrinth chamber 34 by means of lengthening elements such as the hoses 38, 39 or the bottom element 70.

What is claimed is:

1. A fluid drainage arrangement for a battery arrangement, the fluid drainage arrangement comprising:
    a fluid inlet, a collecting chamber, a membrane, a labyrinth chamber and a fluid outlet,
    wherein the membrane is disposed between the collecting chamber and the labyrinth chamber,
    wherein the membrane has a closed state (Z1) and an open state (Z2),
    wherein, in the closed state (Z1), the membrane is configured to collect a coolant in the collecting chamber that was delivered through the fluid inlet, wherein, in the open state (Z2), the membrane is configured to allow drainage of the coolant via the labyrinth chamber to the fluid outlet, and wherein the membrane transitions from the closed state (Z1) into the open state (Z2) at a predetermined first differential pressure between a side of the membrane that is assigned to the collecting chamber and a side of the membrane that is assigned to the labyrinth chamber.

2. The fluid drainage arrangement as claimed in claim 1, wherein after the transition from the closed state (Z1) into the open state (Z2), the membrane is no longer configured to transition into the closed state (Z1).

3. The fluid drainage arrangement as claimed in claim 1, wherein after the transition from the closed state (Z1) into the open state (Z2), the membrane is configured to transition again into the closed state (Z1) either (i) at a lower differential pressure than the first differential pressure or (ii) by way of a manual actuation by a user.

4. The fluid drainage arrangement as claimed in claim 1, further comprising a trough-shaped bottom element having a drainage slope for the coolant, and which drainage slope is fluidically connected to the collecting chamber in order to allow drainage of the coolant from the battery arrangement to the collecting chamber.

5. The fluid drainage arrangement as claimed in claim 4, wherein the drainage slope is fluidically connected to the collecting chamber via a hose.

6. The fluid drainage arrangement as claimed in claim 5, wherein the hose is fastened via at least one clamp.

7. The fluid drainage arrangement as claimed in claim 1, wherein the membrane is configured to perform a transition from the closed state (Z1) into the open state (Z2) if a predetermined amount of coolant has collected on said side of the membrane.

8. The fluid drainage arrangement as claimed in claim 1 further comprising a labyrinth chamber part and a cover part, which labyrinth chamber part forms the labyrinth chamber, which cover part forms the collecting chamber in a cover part extension, and which cover part is connected to the labyrinth chamber part.

9. The fluid drainage arrangement as claimed in claim 8, further comprising a sealing element disposed between the labyrinth chamber part and the cover part.

10. The fluid drainage arrangement as claimed in claim 1, wherein the labyrinth chamber has a lateral wall, a labyrinth interior and shaped elements, which shaped elements extend from the lateral wall into the labyrinth interior in order to prevent or at least to reduce a rectilinear flow of a fluid through the labyrinth chamber.

11. The fluid drainage arrangement as claimed in claim 10, in which the shaped elements approach the fluid outlet at least partially at least in certain portions in their extent from the lateral wall into the labyrinth interior.

12. The fluid drainage arrangement as claimed in claim 10, in which the shaped elements are at least partially flat at least in certain portions.

13. A battery arrangement comprising the fluid drainage arrangement as claimed in claim 1.

14. A vehicle comprising the battery arrangement as claimed in claim 13.

15. The vehicle as claimed in claim 14, wherein the fluid outlet is fluidically connected to surroundings of the vehicle in order to allow drainage of the coolant into the surroundings of the vehicle.

16. The vehicle as claimed in claim 14, wherein the collecting chamber is arranged above the labyrinth chamber at least in certain regions.

* * * * *